United States Patent
Kuwayama et al.

(10) Patent No.: US 9,746,986 B2
(45) Date of Patent: Aug. 29, 2017

(54) STORAGE SYSTEM AND INFORMATION PROCESSING METHOD WITH STORAGE DEVICES ASSIGNING REPRESENTATIVE ADDRESSES TO REDUCE CABLE REQUIREMENTS

(71) Applicant: FUJITSU LIMITED, Kawasaki-shi, Kanagawa (JP)

(72) Inventors: Takashi Kuwayama, Nagoya (JP); Tsuyoshi Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 14/974,358

(22) Filed: Dec. 18, 2015

(65) Prior Publication Data
US 2016/0224269 A1     Aug. 4, 2016

(30) Foreign Application Priority Data
Feb. 2, 2015    (JP) .................................. 2015-018878

(51) Int. Cl.
G06F 3/048      (2013.01)
G06F 11/20      (2006.01)
G06F 3/06       (2006.01)
G06F 3/0481     (2013.01)
G06F 3/0484     (2013.01)

(52) U.S. Cl.
CPC .......... *G06F 3/0481* (2013.01); *G06F 3/0484* (2013.01); *G06F 3/0604* (2013.01); *G06F 3/067* (2013.01); *G06F 3/0638* (2013.01); *G06F 11/20* (2013.01)

(58) Field of Classification Search
CPC .... G06F 3/0638; G06F 3/0484; G06F 3/0481; G06F 3/067; G06F 3/0604; G06F 11/20
See application file for complete search history.

(56) References Cited

U.S. PATENT DOCUMENTS 9,154,367 B1 * 10/2015 Kontothanassis ... H04L 67/1034
2003/0018741 A1 *  1/2003 Mizuno ................. G06F 3/0613
                                                  709/214
(Continued)

FOREIGN PATENT DOCUMENTS

JP          2006-129348         5/2006

*Primary Examiner* — Sanjiv Shah
*Assistant Examiner* — Glenn Gossage
(74) *Attorney, Agent, or Firm* — Fujitsu Patent Center

(57) ABSTRACT

A storage system includes a plurality of storage devices, including a first storage device and an information processor apparatus for managing the storage system. The first storage device is configured to select a second storage device coupled over a network with the information processor apparatus from among the plurality of storage devices, and assign a representative address such as an Internet Protocol (IP) address to be used for communication with the information processor apparatus to the selected second storage device. The second storage device is configured to receive a request addressed to the representative address from the information processor apparatus, and transfer the request to a third storage device among the plurality of storage devices to process the request. An assigned representative address may be canceled when a storage device fails and an internal IP address may be assigned. Storage devices may be selected based on load and the need for cable or hardwired connections may be reduced.

13 Claims, 19 Drawing Sheets

(56) References Cited

U.S. PATENT DOCUMENTS

| | | | | |
|---|---|---|---|---|
| 2004/0057429 | A1* | 3/2004 | Marklund | H04L 29/06 370/389 |
| 2005/0138517 | A1* | 6/2005 | Monitzer | G06F 11/2041 714/746 |
| 2007/0245167 | A1* | 10/2007 | De La Cruz | G06F 11/2025 714/4.11 |
| 2015/0074299 | A1* | 3/2015 | Maniwa | G06F 3/06 710/74 |

* cited by examiner

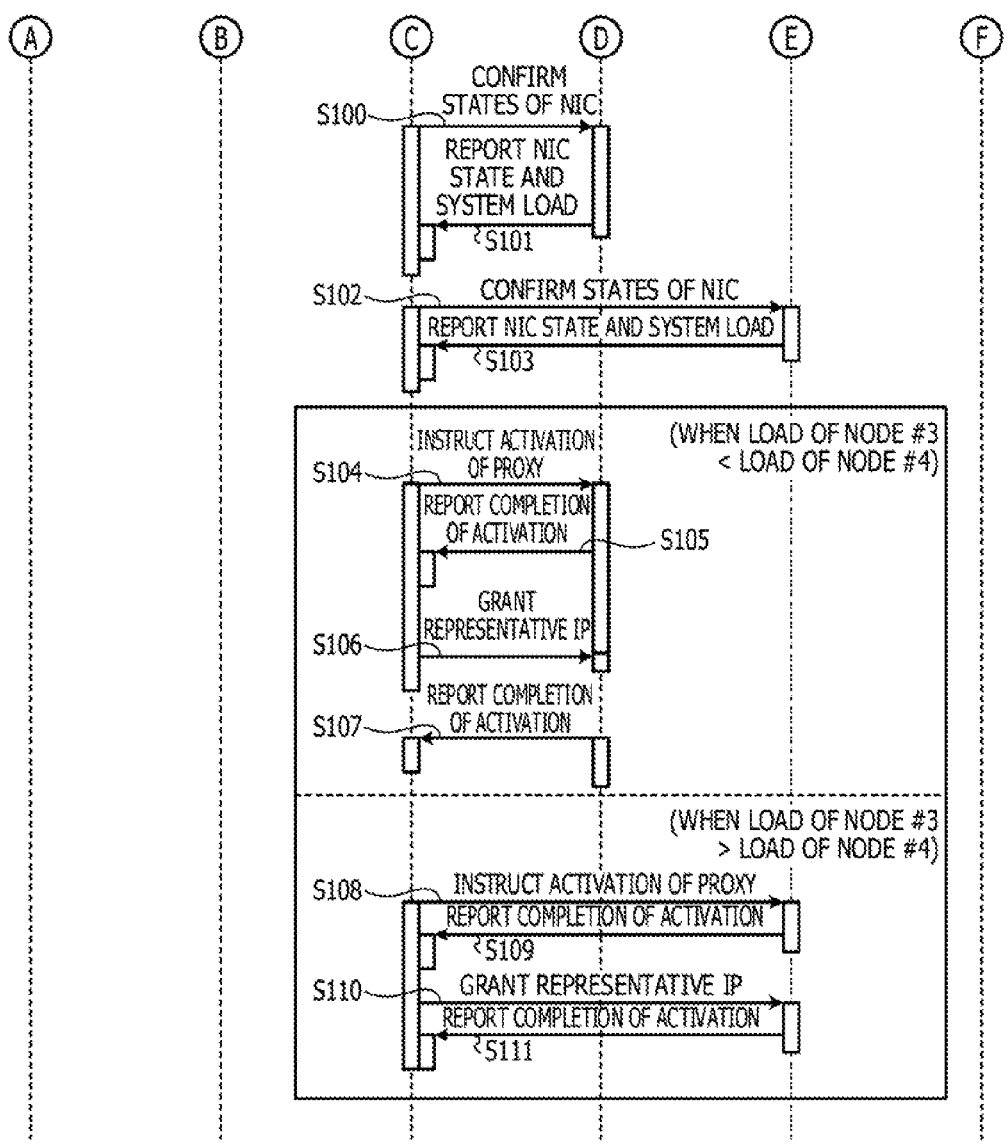

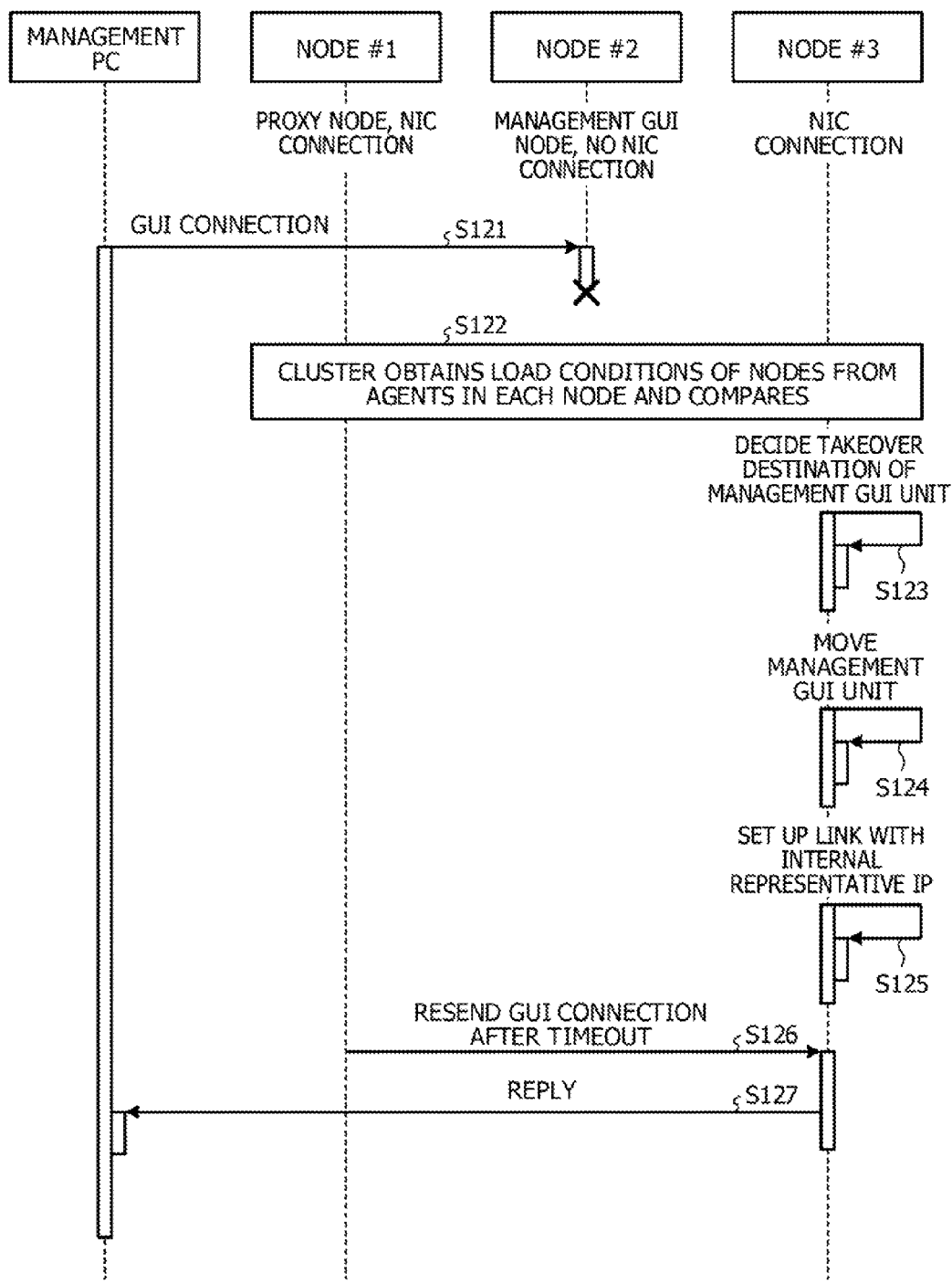

US 9,746,986 B2

STORAGE SYSTEM AND INFORMATION PROCESSING METHOD WITH STORAGE DEVICES ASSIGNING REPRESENTATIVE ADDRESSES TO REDUCE CABLE REQUIREMENTS

CROSS-REFERENCE TO RELATED APPLICATION

This application is based upon and claims the benefit of priority of the prior Japanese Patent Application No. 2015-018878, filed on Feb. 2, 2015, the entire contents of which are incorporated herein by reference.

FIELD

The embodiment discussed herein relates to a storage system and an information processing method.

BACKGROUND

A management graphical user interface (GUI) is provided in an operating terminal used by an administrator for managing a storage system in a scale-out type storage system in which the number of storage devices can be increased as desired. The management GUI is a user interface used by the administrator of the storage system.

A management GUI unit that provides the management GUI in the operating terminal operates in any one storage device. The storage device in which the management GUI unit operates is not necessarily fixed and the management GUI unit may be operated in a storage device with a low processing load for example. However, the storage device in which the management GUI unit operates is desirable connected by cable to the operating terminal for communicating with the operating terminal.

Japanese Laid-open Patent Publication No. 2006-129348 discloses a technique in which the preparation of a device for executing integrated control functions independently from a node is made unnecessary by deciding a master node from a plurality of nodes and enabling only the master node to operate the integrated control functions for controlling all the nodes in an integrated manner.

When the storage device in which the management GUI unit operates is changed in response to load conditions and the like, the cable connection for connecting with the operating terminal is also desirably changed. However, much effort is required to change the cable connection for connecting with the operating terminal each time the management GUI unit is moved. As a result, it is desirable that all of the storage devices are connected with the operating terminal by cables.

However, there is a problem that much effort is required to connect all of the storage devices with the operating terminal by cable for each increase if there is an increase in the number of storage devices such as in a scale-out type storage system. The cost of the cable also increases. As a result, it is desirable to reduce the effort for hardwiring and the cost for hardwiring in a storage system.

SUMMARY

According to an aspect of the invention, a storage system includes an information processor apparatus for managing the storage system; and a plurality of storage devices respectively including a first storage device, wherein the first storage device is configured to select a second storage device coupled over a network with the information processor apparatus from among the plurality of storage devices, and assign a representative address to be used for communication with the information processor apparatus to the selected second storage device, wherein the second storage device is configured to receive a request addressed to the representative address from the information processor apparatus, and transfer the request to a third storage device among the plurality of storage devices to process the request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 16A and 16B illustrate a processing sequence for granting a representative IP address when there are a plurality of candidates for movement destinations of the representative IP address;

FIG. 17 illustrates a processing sequence for switching the management GUI node when a node in which both a manager and the management GUI unit operate fails.

DESCRIPTION OF EMBODIMENT

Hereinbelow, an embodiment of a storage system and a storage control program as disclosed herein will be described with reference to the accompanying drawings. The embodiments disclosed herein are not intended to limit the following techniques.

Embodiment

Figure 1:
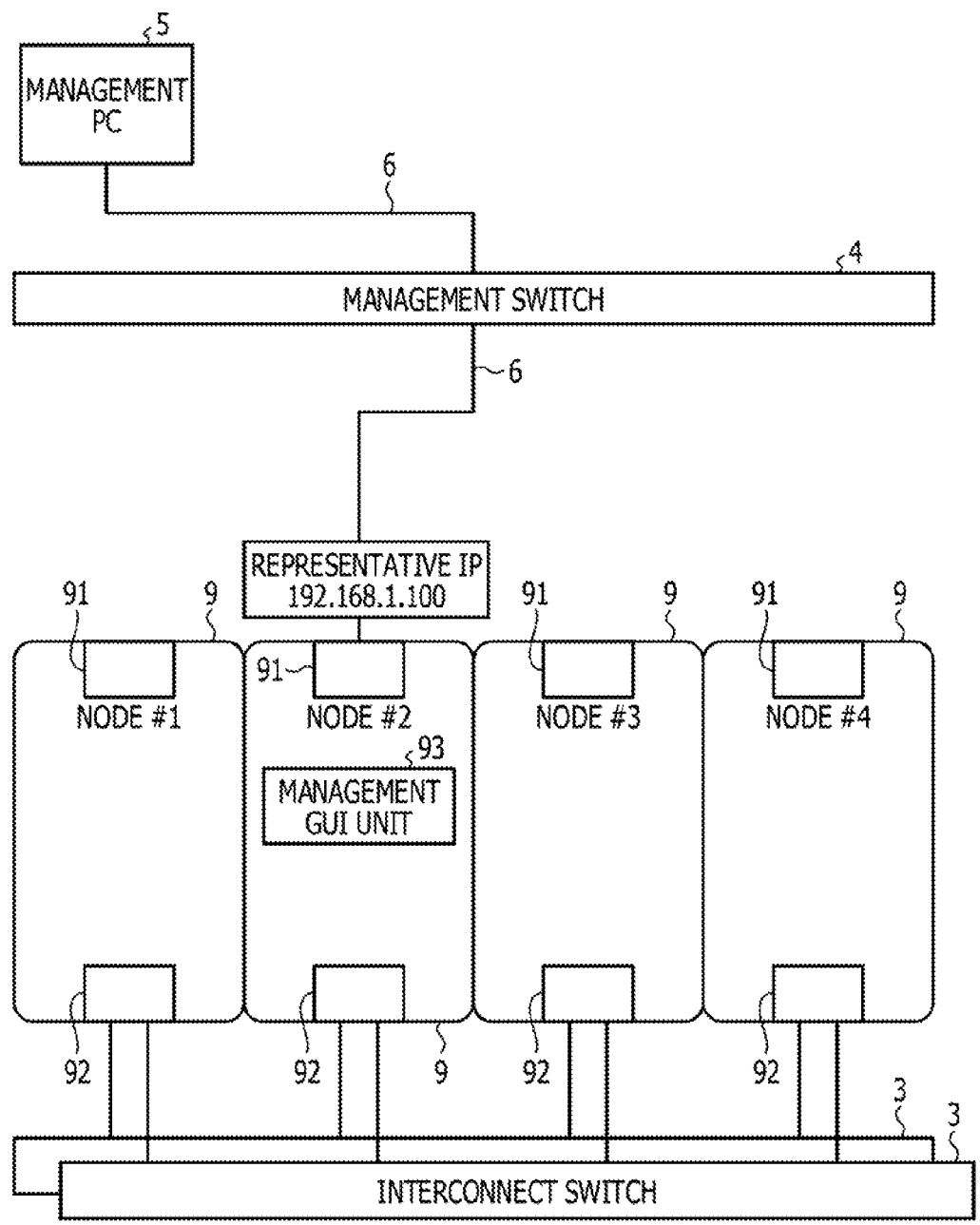
FIG. 1 is a view for explaining access to a management GUI unit from a management personal computer (PC)

First, access from a management device (referred to below as a management PC) to a management GUI unit will be discussed. The management PC is an operating terminal that is an information processor apparatus used for managing by an administrator of a storage system. FIG. 1 is a view for explaining access to the management GUI unit from the management PC.

As illustrated in FIG. 1, a management PC 5 is connected via a management switch 4 to a node #2 by a management LAN 6. The nodes #n (n=1 to 4) each represent a storage device. A management GUI unit 93 operates in the node #2. Each node 9 has a management port 91 for enabling the management PC 5 to access the management GUI unit 93. Each node 9 has an interconnect port 92 for communicating with another node 9. Each of the nodes 9 are interconnected via an interconnect switch 3. The interconnect switch 3 is duplicated.

The management PC 5 communicates with the nodes 9 using a representative internet protocol (IP) address. The representative IP address is an IP address used for enabling the management PC 5 to communicate with the management GUI unit 93. The representative IP address in FIG. 1 is "192.168.1.100" and is granted to the node #2.

Figure 2:
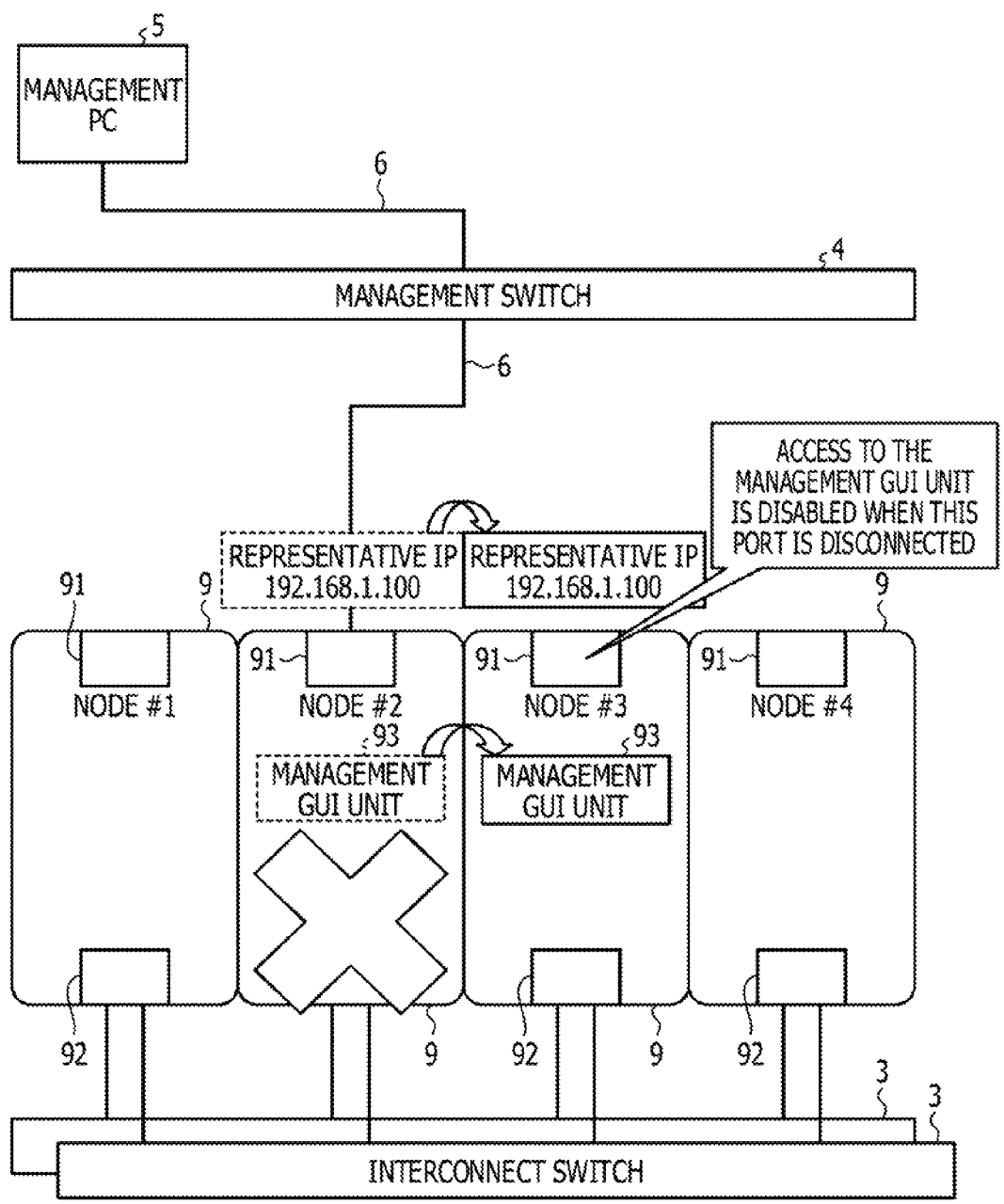
FIG. 2 is a view for explaining access to a management GUI unit from a management PC when a node has failed.

In FIG. 1, when the node #2 fails, the management GUI unit 93 is moved to the node #3 for example. FIG. 2 is a view for explaining access to the management GUI unit 93 from the management PC 5 when a node has failed. As illustrated in FIG. 2, the representative IP address is also moved to the node #3 when the management GUI unit 93 is moved to the node #3. As a result, the management PC 5 is able to communicate with the management GUI unit 93 using the same IP address even when the node 9 in which the management GUI unit 93 operates is moved. However, if the management PC 5 is not hardwired to the port 91 of the node #3 via the management switch 4, the management PC 5 is unable to access the management GUI unit 93.

Figure 3:
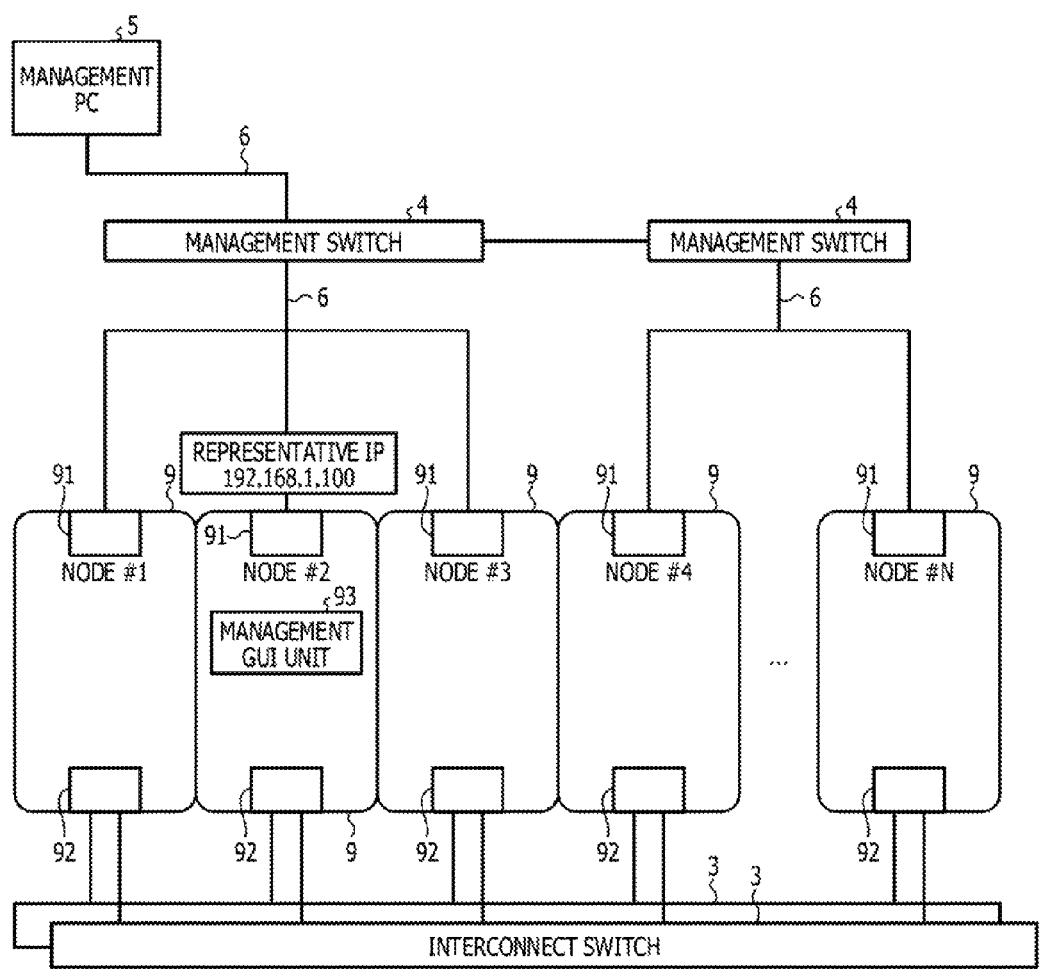
FIG. 3 is a view for explaining hardwiring between all the nodes and the management PC.

Changing the hardwiring between the node 9 and the management switch 4 each time a node 9 in which the management GUI unit 93 operates is changed due to the failure of the node 9 is troublesome. Accordingly, hardwiring the management PC 5 to all of the nodes 9 can be considered. FIG. 3 is a view for explaining hardwiring between all the nodes 9 and the management PC 5. As illustrated in FIG. 3, the management port 91 of each node 9 is hardwired to the management PC 5 via the management switches 4.

If the number of the nodes 9 is small, the management PC 5 can be hardwired to all of the nodes 9 as illustrated in FIG. 3. However, if the number of nodes 9 increases to a range of several tens of nodes 9 as in a scale-out type storage system, hardwiring all of the nodes 9 is impractical. Hardwiring all of the nodes 9 is time-consuming. Cables and management switches 4 are desirably added for hardwiring all of the nodes 9. Therefore, it is desirable to enable access from the management PC 5 to the management GUI unit 93 even when the management GUI unit 93 is operating in any node 9 while minimizing the hardwiring with cables.

Figure 4:
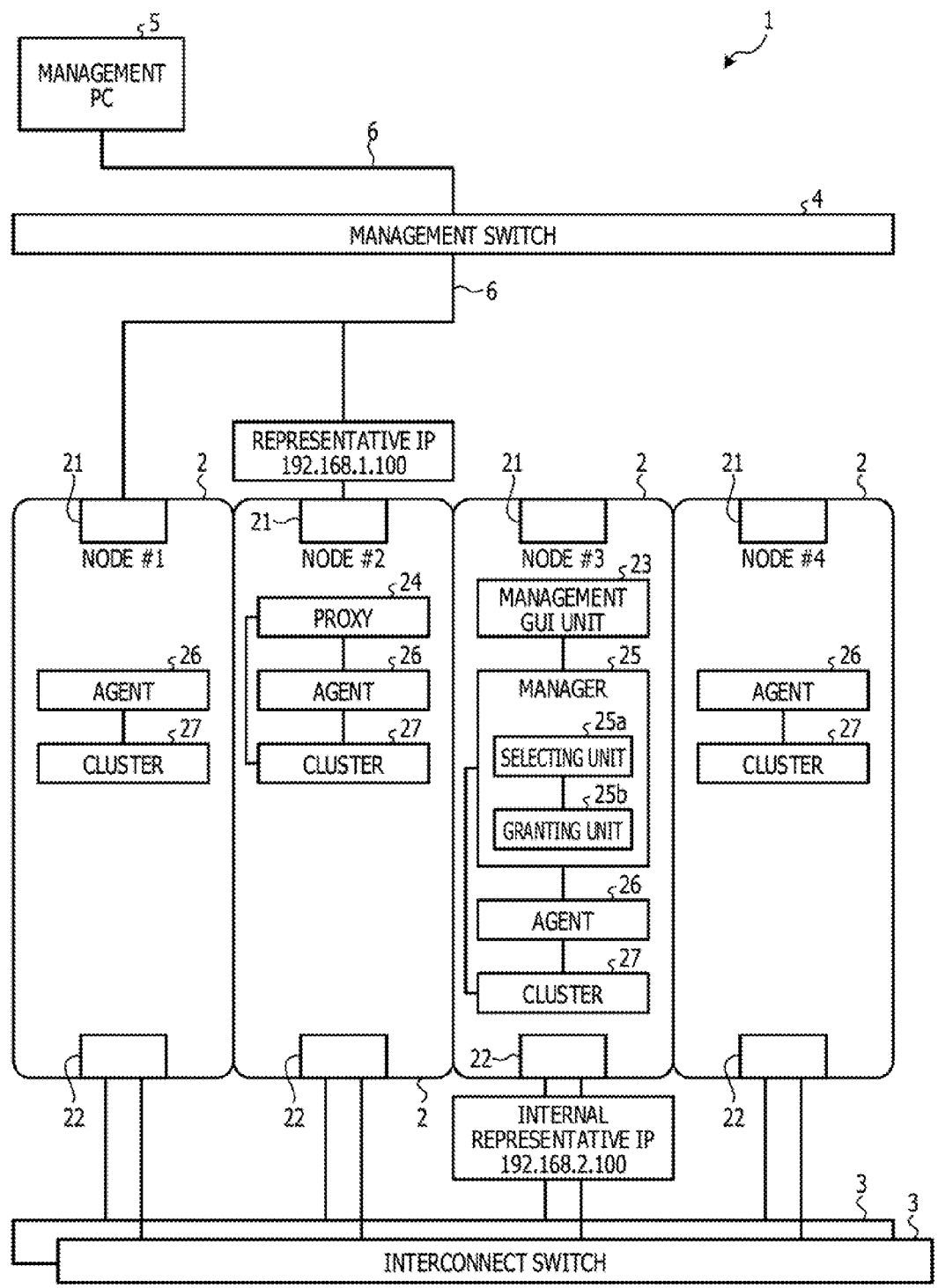
FIG. 4 illustrates an example of a storage system configuration according to an embodiment.

Therefore, it is desirable to minimize the cable hardwiring in the storage system according to the embodiment in order to enable the management PC 5 to access the management GUI unit 93 even when the management GUI unit 93 operates in any of the nodes 9. FIG. 4 is an example of a storage system configuration of the embodiment.

As illustrated in FIG. 4, a storage system 1 according to the embodiment includes four nodes 2, two interconnect switches 3, the management switch 4, and the management PC 5. While four nodes 2, two interconnect switches 3, and one management switch 4 are illustrated for the sake of convenience, the storage system 1 may have more nodes 2, interconnect switches 3, and management switches 4. The four nodes 2 are represented by nodes #1 to #4.

The nodes 2 are storage devices for storing data. The nodes 2 are realized by non-volatile storage devices such as hard disk drives (HDD) or solid state drives (SSD) and the like. The nodes 2 each have a management port 21 as a port for connecting with the management switch 4. The nodes 2 each have an interconnect port 22 as a port for connecting with the interconnect switches 3.

The interconnect switch 3 is a switch for enabling communication between the nodes 2. The interconnect switch 3 is hardwired to the interconnect port 22 in each node 2. The interconnect switch 3 is duplicated.

The management switch 4 is a switch for enabling a connection between the management PC 5 and the nodes 2 over the management LAN 6. The management switch 4 is connected to the management PC 5, the node #1, and the node #2. That is, the management PC 5 is only connected to two of the four nodes 2, the node #1 and the node #2. The management PC 5 is an operating terminal used by the administrator of the storage system 1 to control the nodes 2.

An agent 26 and a cluster 27 operate in the node #1 and the node #4. A proxy 24, the agent 26, and the cluster 27 operate in the node #2. A management GUI unit 23, a manager 25, the agent 26, and the cluster 27 operate in the node #3.

The management GUI unit 23 provides a management GUI. That is, the management GUI unit 23 displays a screen of the management GUI on a display device of the management PC 5 and receives instructions from the administrator of the storage system 1 via a mouse and a keyboard.

The proxy 24 receives an access request for the management GUI unit 23 from the management PC 5 and redirects the received access request to the management GUI unit 23 by using the interconnect switch 3. The representative IP address is granted to the node #2. The access request from the management PC 5 to the management GUI unit 23 is received by the proxy 24 in the node #2.

An internal representative IP address is granted to the node #3 in which the management GUI unit 23 operates. The proxy 24 redirects the access from the management PC 5 to the internal representative IP address. The internal representative IP address is an IP address used when the proxy 24 accesses the management GUI unit 23. The internal representative IP address in FIG. 4 is "192.168.2.100". The proxy 24 is able to operate in the node #1 or the node #2 hardwired to the management switch 4.

The manager 25 manages the storage system 1. Specifically, the manager 25 selects the node #2 in which the proxy 24 operates and grants the representative IP address to the selected node #2. In FIG. 4, the proxy 24 operates in the node #2 and the representative IP address is granted to node #2.

The manager 25 selects the node 2 in which the management GUI unit 23 operates and grants the internal representative IP address to the selected node 2. In FIG. 4, the management GUI unit 23 operates in the node #3 and the internal representative IP address is granted to the node #3. The management GUI unit 23 and the manager 25 operate in the same node 2 in FIG. 4. However, the management GUI unit 23 and the manager 25 may also operate in different nodes 2.

The manager 25 includes a selecting unit 25*a* and a granting unit 25*b*. The selecting unit 25*a* selects, based on load conditions, the node 2 in which the proxy 24 is to operate from among the nodes 2 hardwired with the management PC 5 and activates the proxy 24 in the selected node 2. When the node 2 in which the proxy 24 operates fails, the selecting unit 25*a* selects, based on load conditions, another node 2 in which the proxy 24 is to operate from among the nodes 2 connected to the management PC 5 and activates the proxy 24 in the selected node 2.

The selecting unit 25*a* selects, based on load conditions, the node 2 in which the management GUI unit 23 is to operate and activates the proxy 24 in the selected node 2. When the node 2 in which the management GUI unit 23 operates fails, the selecting unit 25*a* selects, based on load conditions, another node 2 in which the management GUI unit 23 is to operate. The selecting unit 25*a* then activates the management GUI unit 23 in the selected node 2. If the management GUI unit 23 and the selecting unit 25*a* operate in the same node 2 and if the node 2 in which the management GUI unit 23 operates fails, the node 2 that constitutes a storage cluster with the failed node 2 selects a node 2 in which the management GUI unit 23 desirably operates and activates the management GUI unit 23. The node 2 that constitutes the storage cluster is the node 2 that takes over the management of the other nodes 2 when one of the nodes 2 has failed.

The granting unit 25*b* grants the representative IP address to the node 2 in which the proxy 24 is activated by the selecting unit 25*a*. The granting unit 25*b* cancels the representative IP address granted to the node 2 that has failed when the node 2 in which the proxy 24 operates fails. The granting unit 25*b* then grants the representative IP address to the node 2 in which the proxy 24 is newly activated by the selecting unit 25*a*.

The granting unit 25*b* grants the internal representative IP address to the node 2 in which the management GUI unit 23 is activated by the selecting unit 25*a*. The granting unit 25*b* cancels the internal representative IP address granted to the node 2 that has failed when the node 2 in which the management GUI unit 23 operates fails. The granting unit 25*b* then grants the internal representative IP address to the node 2 in which the management GUI unit 23 is newly activated by the selecting unit 25*a*.

The agent 26 monitors the operating conditions and the load conditions of the nodes 2 and the operating conditions of network interface cards (NICs) and reports the monitoring results to the cluster 27.

The cluster 27 obtains the operating conditions of the nodes 2 from the agent 26. When the node 2 fails, the cluster 27 causes the node 2 that constitutes the storage cluster with the failed node 2 to take over the processing. The cluster 27 monitors the manager 25 and implements the takeover of the manager 25 to a normal (not failed) node 2 when the manager 25 terminates due to an abnormality.

Figure 5:
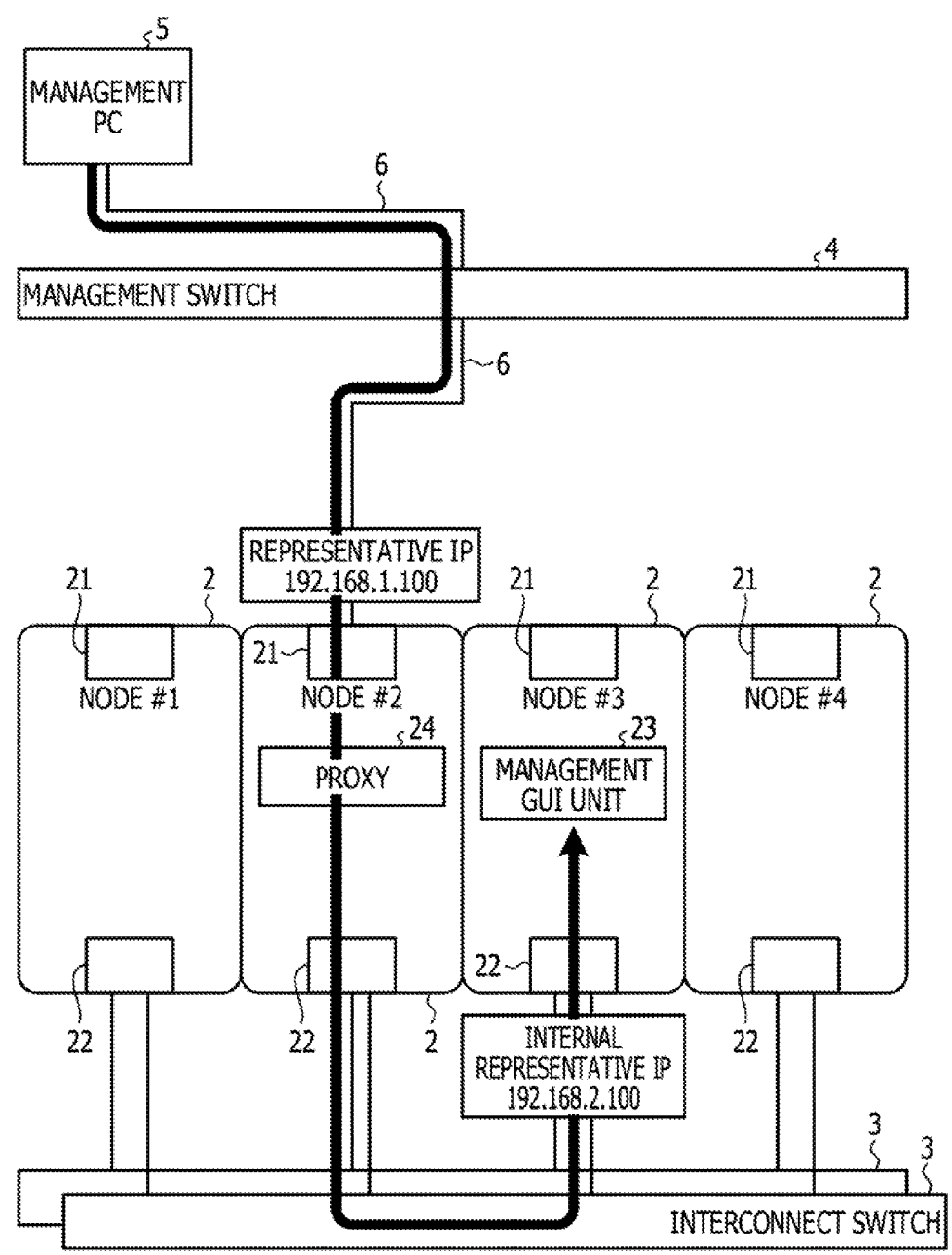
FIG. 5 is a view for explaining a redirect to the management GUI unit by a proxy.

Next, redirecting by the proxy 24 to the management GUI unit 23 will be discussed. FIG. 5 is a view for explaining a redirect to the management GUI unit 23 by the proxy 24. FIG. 5 illustrates a case in which the proxy 24 to operate in the node #2 is selected when the storage system 1 is activated and the representative IP address is granted to the node #2.

As illustrated in FIG. 5, when the management PC 5 accesses the representative IP address, the proxy 24 in the node #2 granted the representative IP address redirects the access from the management PC 5 to the internal representative IP address. Then the management GUI unit 23 in the node #3 granted the internal representative IP address issues a reply to the proxy 24. The proxy 24 then issues a reply to the management PC 5. The screen of the management GUI is then displayed on the display device of the management PC 5.

In this way, the proxy 24 redirects the access to the representative IP address to the management GUI unit 23 whereby the management PC 5 is able to access the management GUI unit 23 even if the management PC 5 is not hardwired with the node 2 in which the management GUI unit 23 operates. By making the internal representative IP address a fixed value and granting the internal representative IP address to the node 2 in which the management GUI unit 23 is present, the IP address of the redirect destination becomes fixed and costs for selecting the redirect destination can be reduced. Furthermore, the interconnection between the nodes 2 is connected with two paths whereby another path can be used as a switching destination when one of the paths fails.

Figure 6:
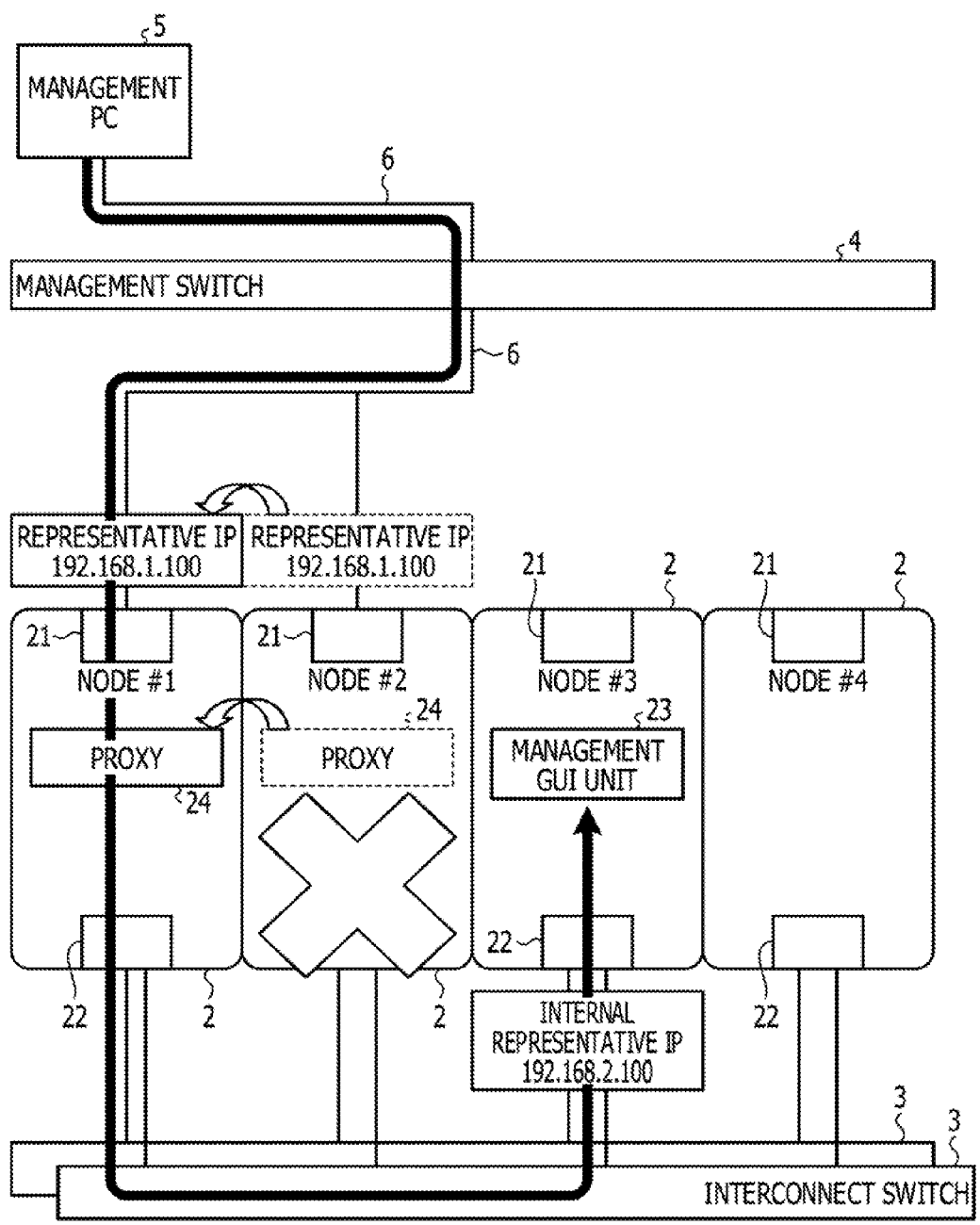
FIG. 6 is a view for explaining movement of a proxy when the node in which the proxy operates fails.

Next, moving the proxy 24 when the node 2 in which the proxy 24 operates fails is discussed. FIG. 6 is a view for explaining movement of the proxy 24 when the node 2 in which the proxy 24 operates fails.

As illustrated in FIG. 6, when the node #2 in which the proxy 24 operates fails, the manager 25 (shown in FIG. 4) selects the node #1 which is linked through the management port 21. The linkage with the management port 21 indicates that the management port 21 is hardwired with the management switch 4. In FIG. 6, the only node 2 that is linked other than the node #2 is the node #1. However, usually a plurality of nodes 2 are linked. In this case, the manager 25 selects the node 2 based on conditions such as the fact that the CPU and the memory have much space, the I/O load is low, the communication path with the management GUI unit 23 is stable, the node 2 in which the management GUI unit 23 operates is connected to the same interconnect switch 3, and the like.

Here, "CPU" indicates a "central processing unit" and "I/O" indicates "input/output". The stability of the communication path with the management GUI unit 23 is determined based on a failure record of heartbeats between the nodes 2 for example. There is less likelihood of a path abnormality occurrence due to the failure of the interconnect switch 3 when the node 2 in which the management GUI unit 23 operates is connected to the same interconnect switch 3. In FIG. 6, all of the nodes 2 are connected to one interconnect switch 3. However, when there is a large number of nodes 2, the nodes 2 may be connected via a plurality of interconnect switches 3. In this case, the likelihood of a path abnormality occurrence increases by the amount of failures that may occur in the connection ports between the interconnect switches 3.

The manager 25 selects the node #1 and moves the representative IP address and the proxy 24 to the node #1. Specifically, the manager 25 cancels the representative IP address of the node #2. The manager 25 then grants a new representative IP address to the node #1. The manager 25 stops the proxy 24 in the node #2 and activates the proxy 24 in the node #1.

The management PC 5 then accesses the management GUI unit 23 of the node #2 through the proxy 24 that operates in the node #1. In this way, even when the node 2 to which the representative IP address is granted fails when the management PC 5 is connected to a plurality of nodes 2, the representative IP address and the proxy 24 are moved to another hardwired node 2 and the management PC 5 is able to access the management GUI unit 23. The likelihood of a plurality of nodes 2 failing at the same time is low. It is sufficient to keep the number of nodes 2 that are hardwired to a few. By keeping the number of hardwired nodes 2 to only a few, the effort required for hardwiring on a large scale and the costs for cables and the management switch 4 can be reduced in comparison to hardwiring all of the nodes 2.

Figure 7:
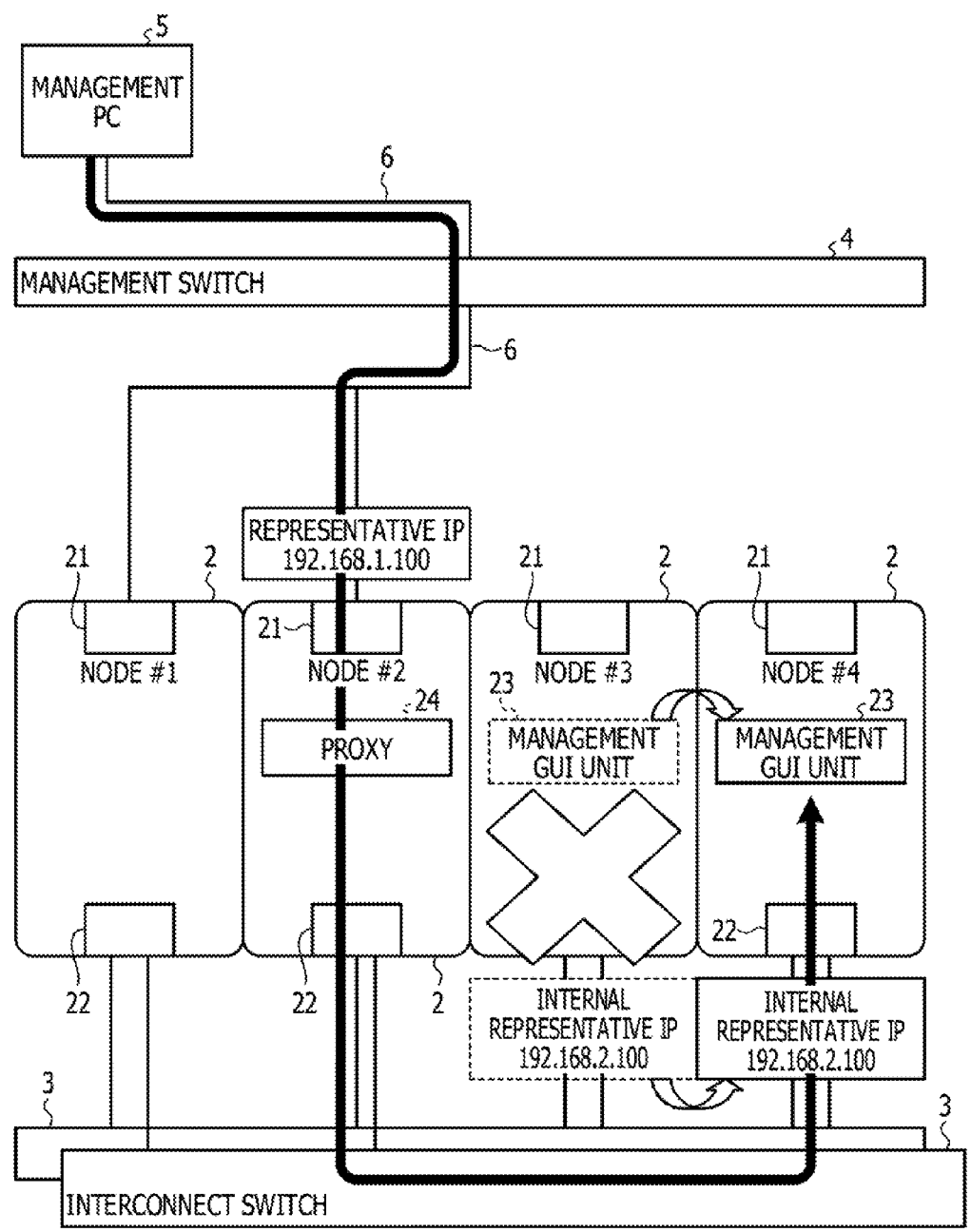
FIG. 7 is a view for explaining movement of the management GUI unit when the node in which the management GUI unit operates fails.

Next, moving the management GUI unit 23 when the node 2 in which the management GUI unit 23 operates fails is discussed. FIG. 7 is a view for explaining the movement of the management GUI unit 23 when the node 2 in which the management GUI unit 23 operates fails.

As illustrated in FIG. 7, when the node #3 in which management GUI unit 23 operates fails, the manager 25 (shown in FIG. 4) selects the normal node #4. However, if the manager 25 is operating in the same node as the management GUI unit 23, the manager 25 in the node 2 that constitutes the storage cluster (see, e.g., FIG. 4) is activated and the activated manager 25 selects the normal node 2. The manager 25 selects the node 2 based on conditions such as the fact that the CPU and the memory have much space, the I/O load is low, the communication path with the proxy 24 is stable, the node 2 in which the proxy 24 operates is connected to the same interconnect switch 3, and the like.

The manager 25 then moves the internal representative IP address and the management GUI unit 23 to the node #4 after selecting the node #4. Specifically, the manager 25 cancels the representative IP address of the node #3. The manager 25 then grants a new representative IP address to the node #4. The manager 25 stops the management GUI unit 23 in the node #3 and activates the management GUI unit 23 in the node #4.

The management PC 5 then accesses the management GUI unit 23 of the node #4 through the proxy 24 that operates in the node #2. In this way, the management PC 5 is able to continue accessing the management GUI unit 23 due to the movement of the management GUI unit 23 to the normal (not failed) node 2.

Figure 8:
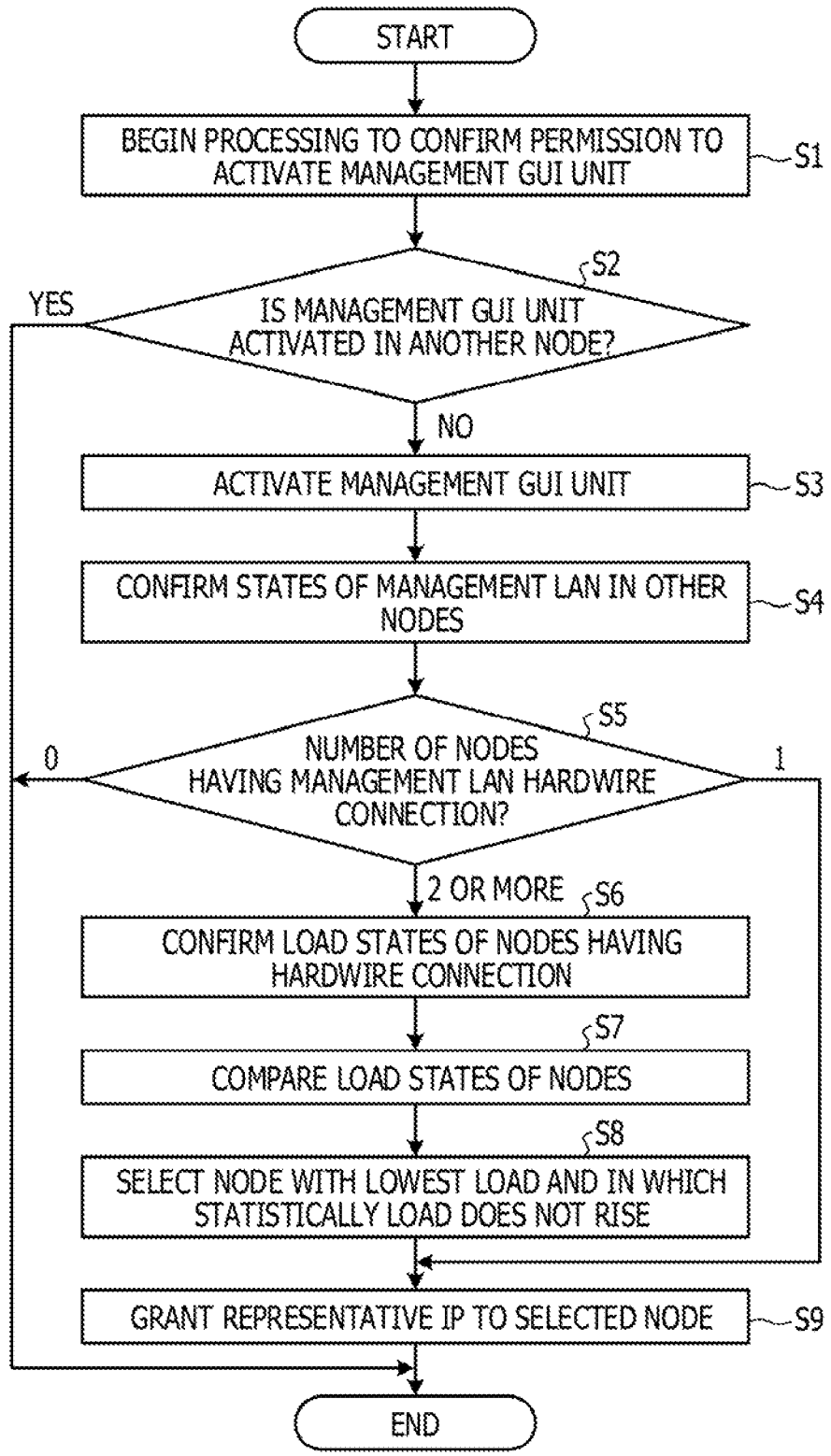
FIG. 8 is a flow chart illustrating a processing flow for granting a representative Internet Protocol (IP) address.

Next, the processing flow for granting the representative IP address will be explained. FIG. 8 is a flow chart illustrating a processing flow for granting a representative IP address. As illustrated in FIG. 8, the manager 25 begins the processing to confirm permission to activate the management GUI unit 23 (51). Next, the manager 25 determines whether the management GUI unit is activated in another node 2 (S2). If it is determined that the management GUI unit 23 is activated in another node 2 (S2: Yes), the manager 25 ends the processing.

Conversely, if it is determined that no management GUI unit 23 is activated in another node 2 (S2: No), the manager 25 activates the management GUI unit 23 (S3). Next, the manager 25 confirms the states of the management LAN 6 with each of the nodes 2 (S4). The manager 25 then determines the count or number of nodes 2 hardwired to the management LAN 6 (S5).

If the number of the nodes 2 hardwired to the management LAN 6 is zero in S5, the manager 25 ends the processing. Conversely, if the number of the nodes 2 hardwired to the management LAN 6 is one, the manager 25 selects the node 2 hardwired to the management LAN 6 as the node 2 to which the representative IP address is to be granted and grants the representative IP address to the selected node 2 (S9).

Conversely, if the number of the nodes 2 hardwired to the management LAN 6 is two or more, the manager 25 confirms the load states of the hardwired nodes 2 (S6). Next, the manager 25 compares the load states of the nodes 2 (S7). The manager 25 then selects the node 2 having the lowest load and in which the load statistically does not increase (S8). The manager 25 then grants the representative IP address to the selected node 2 (S9).

In this way, the management PC 5 is able to communicate with the management GUI unit 23 due to the manager 25 granting the representative IP address to the node 2 selected from among the nodes 2 hardwired to the management LAN 6.

Figure 9:
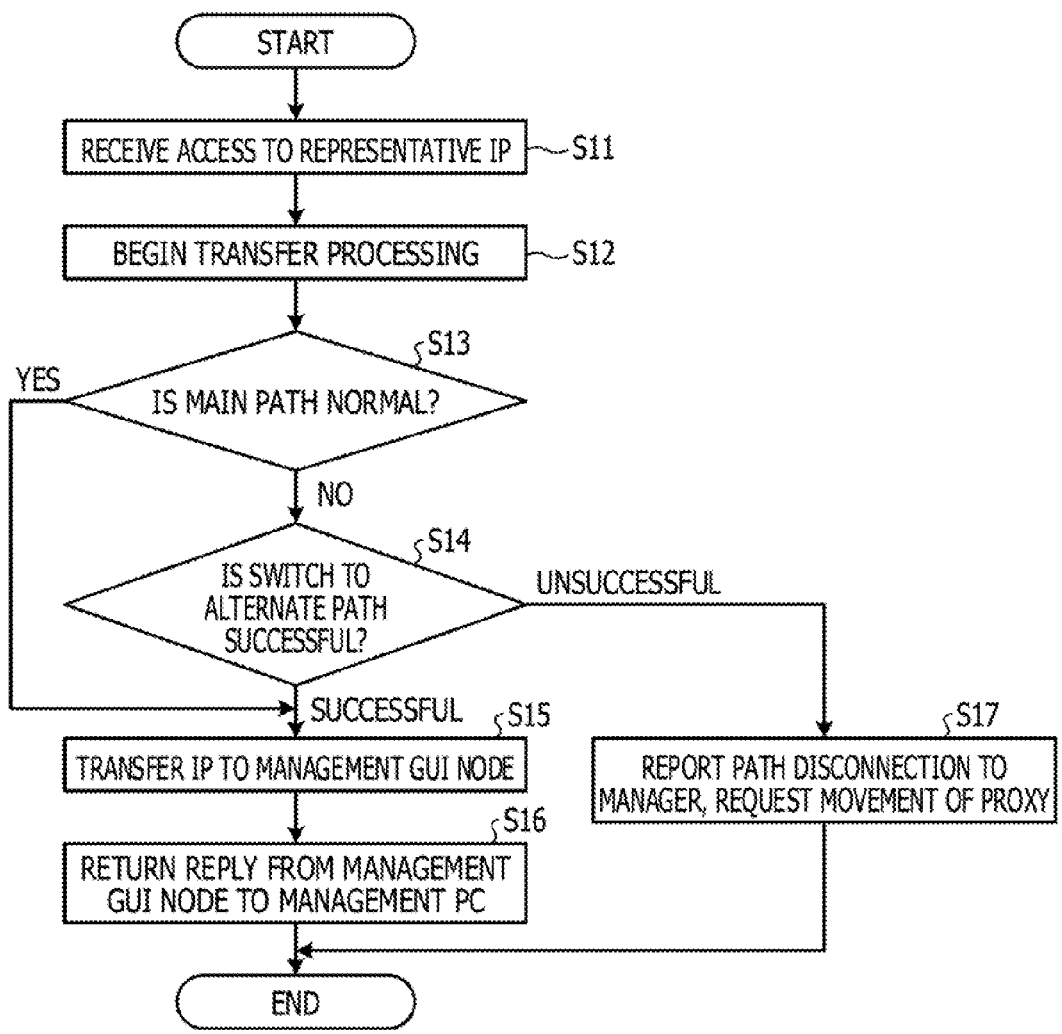
FIG. 9 is a flow chart illustrating processing to redirect to the management GUI unit by a proxy.

Next, redirecting by the proxy 24 to the management GUI unit 23 will be discussed. FIG. 9 is a flow chart illustrating processing to redirect a management GUI unit 23 by the proxy 24. As illustrated in FIG. 9, the proxy 24 receives the access by the management PC 5 to the representative IP address (S11). The proxy 24 then begins the processing to transfer the received access (S12).

The proxy 24 then confirms the transfer path and determines whether a main path is normal (S13). If it is determined that the main path is normal (S13: Yes), the proxy 24 transfers the IP address for the access from the management PC 5 to a management GUI node (S15). The proxy 24 then returns the reply from the management GUI node to the management PC 5 (S16). The management GUI node in this case is the node 2 in which the management GUI unit 23 operates.

Conversely, if it is determined that the main path is not normal (S13: No), the proxy 24 switches to an alternate path and determines whether the switch to the alternate path is successful (S14). If it is determined that the switch to the alternate path is successful (S14: Yes), the proxy 24 transfers the IP address for the access from the management PC 5 to the management GUI node (S15). The proxy 24 then returns the reply from the management GUI node to the management PC 5 (S16). If it is determined that the switch to the alternate path is not successful (S14: No), the proxy 24 reports a path disconnection to the manager 25 and requests movement of the proxy 24 (S17). The manager 25 then moves the proxy 24.

In this way, the management GUI unit 23 is able to receive access from the management PC 5 due to the proxy 24 transferring the IP address for the access from the management PC 5 to the management GUI node.

Figure 10:
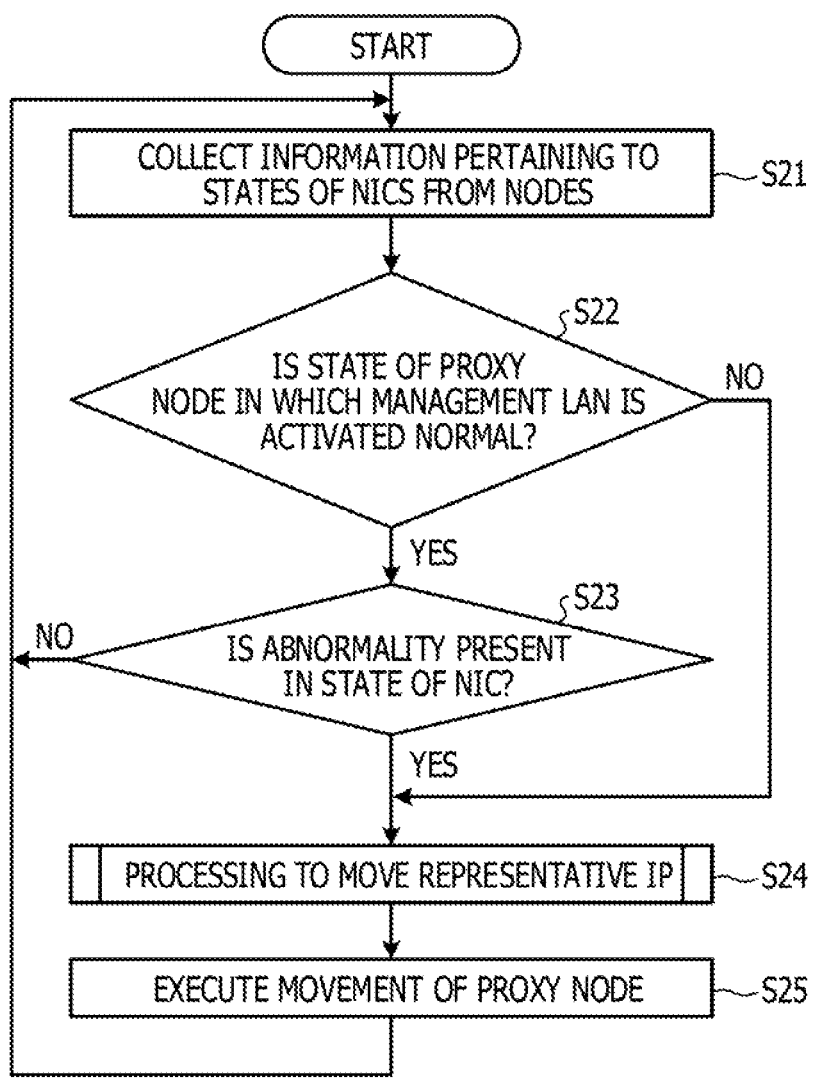
FIG. 10 is a flow chart illustrating a processing flow for monitoring the state of a management Local Area Network (LAN)

Next, the flow for processing for monitoring the state of the management LAN 6 will be discussed. FIG. 10 is a flow chart illustrating a processing flow for monitoring the state of the management LAN 6. As illustrated in FIG. 10, the manager 25 collects information pertaining to the states of the NICs from the nodes 2 (S21). The manager 25 periodically collects information pertaining to the states of the NICs from the nodes 2.

The manager 25 then determines whether the state of a proxy node in which the management LAN 6 is activated is normal (S22). The proxy node is the node 2 in which the proxy 24 operates. If it is determined that the state of the proxy node is normal (S22: Yes), the manager 25 determines whether the state of the NIC in the proxy node has an abnormality (S23). If it is determined that the state of the NIC in the proxy node has no abnormality (S23: No), the routine returns to S21.

Conversely, if it is determined that the state of the proxy node is not normal (S22: No) or if it is determined that the state of the NIC of the proxy node has an abnormality (S23: Yes), the manager 25 executes the representative IP address movement processing to move the representative IP address (S24). The manager 25 then executes the movement of the proxy node (S25). The routine of the manager 25 then returns to S21.

Figure 11:
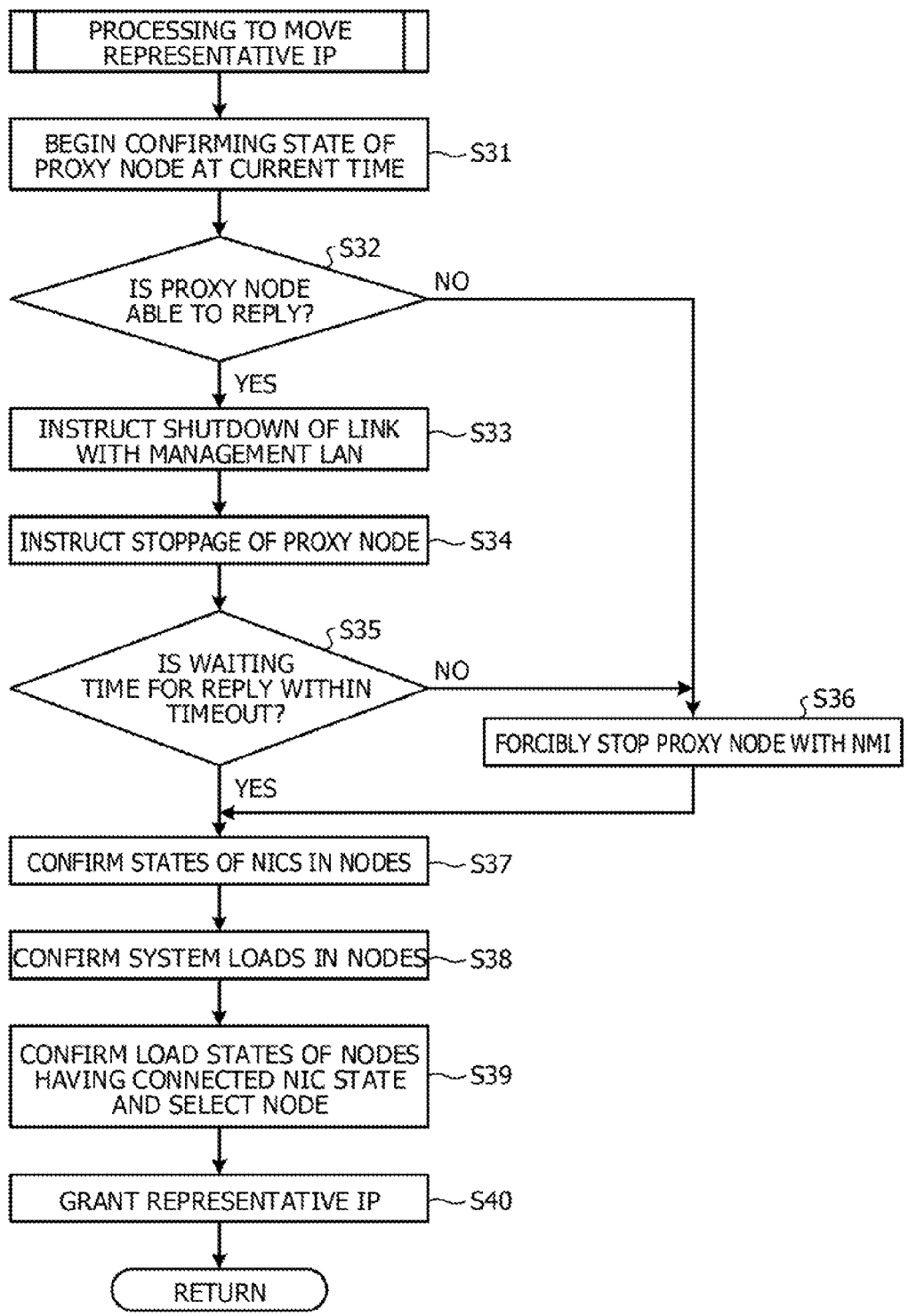
FIG. 11 is a flow chart illustrating a processing flow for moving a representative IP address.

FIG. 11 is a flow chart illustrating a processing flow for moving a representative IP address. As illustrated in FIG. 11, the manager 25 begins confirming the state of the proxy node at the current time (S31). The manager 25 then determines whether the proxy node is able to reply (S32). If it is determined that the proxy node is able to reply (S32: Yes), the manager 25 instructs the link with the management LAN 6 to the proxy node to be shut down (S33). The manager 25 then instructs the stoppage of the proxy node (S34). The shutting down of the linkage with the management LAN 6 represents stopping communication with the management LAN 6.

The manager 25 then determines whether a waiting time for a reply from the proxy node is within a timeout (S35). If it is determined that the waiting time for the reply is not within the time-out (S35: No), the manager 25 forcibly stops the proxy node with a non-maskable interrupt (NMI) (S36). If it is determined that the proxy node is not able to reply in S32 (S32: No), the manager 25 forcibly stops the proxy node with the NMI (S36).

If it is determined that the reply wait is within the timeout (S35: Yes), the manager 25 confirms the states of the NICs in the nodes 2 (S37). Next, the manager 25 confirms the system loads of the nodes 2 (S38). The manager 25 then confirms the load states of the nodes 2 in which the NICs are in connected states and selects a node 2 (S39). The manager 25 then grants the representative IP address to the selected node 2 (S40).

In this way, the manager 25 monitors the proxy node and moves the proxy node and the representative IP address if the proxy node has an abnormality. As a result, the management PC 5 is able to access the management GUI unit 23 even when the node 2 in which the proxy 24 operates fails.

Figure 12:
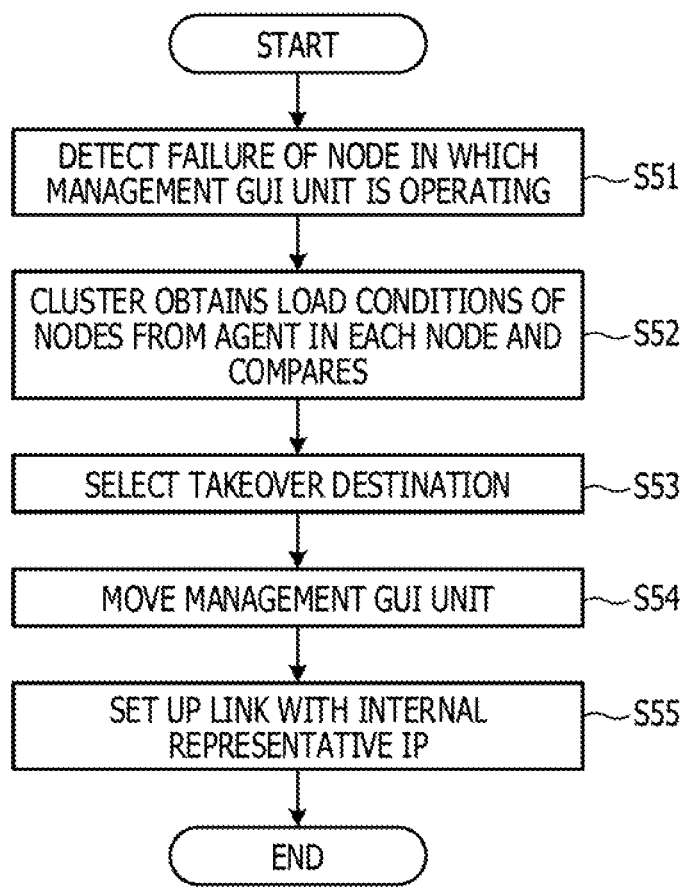
FIG. 12 is a flow chart illustrating a processing flow for switching a management GUI node.

A processing flow for switching the management GUI node will be discussed next. FIG. 12 is a flow chart illustrating a processing flow for switching a management GUI node. As illustrated in FIG. 12, when the cluster 27 detects the failure of the node 2 in which the management GUI unit 23 is operating (S51), the cluster 27 takes over processing by the failed node 2 through processing to switch the cluster, and activates the manager 25. The cluster 27 in this case is the cluster 27 that operates in the node 2 that constitutes the storage cluster with the failed node 2. The processing to switch the cluster is processing for taking over the processing of the failed node 2 by the node 2 that constitutes the storage cluster with the failed node 2.

The cluster 27 obtains the load conditions of the nodes 2 from the agent 26 in each node 2 and compares the load conditions (S52). The manager 25 selects the takeover destination of the management GUI unit 23 (S53). The manager 25 then moves the management GUI unit 23 to the selected takeover destination (S54). The manager 25 sets up the link with the internal representative IP address in the selected takeover destination (S55). Setting up the link with the internal representative IP address involves granting the internal representative IP address to the management GUI node that is the switching destination to enable communication using the internal representative IP address.

In this way, the manager 25 moves the management GUI unit 23 and the internal representative IP address whereby the management PC 5 is able to access the management GUI unit 23 even if the node 2 in which the management GUI unit 23 operates has failed.

Figure 13:
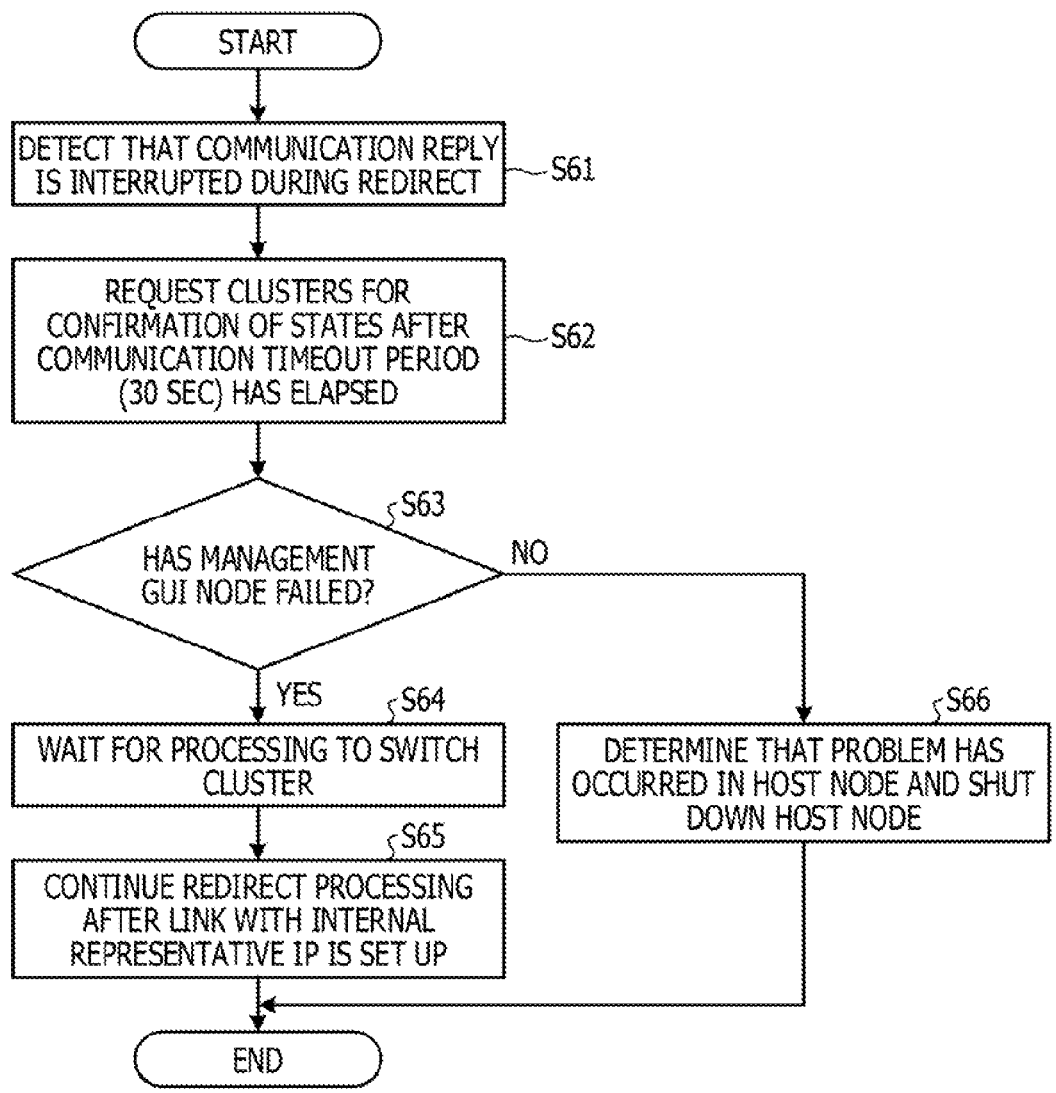
FIG. 13 is a flow chart illustrating a processing flow of a proxy when a node in which the management GUI unit operates fails.

Processing of the proxy 24 when the node 2 in which the management GUI unit 23 operates fails will be discussed next. FIG. 13 is a flow chart illustrating a processing flow of the proxy 24 when the node 2 in which the management GUI unit 23 operates fails.

As illustrated in FIG. 13, the proxy 24 detects that a communication reply while redirecting an access from the management PC 5 has been interrupted (S61), and the proxy 24 requests the cluster 27 to confirm the states after a communication timeout period has elapsed (S62). In this case, the communication timeout period is 30 seconds for example.

The proxy 24 then determines whether the management GUI node has failed (S63). If it is determined that the management GUI node has failed (S63: Yes), the proxy 24 waits for the processing to switch the cluster (S64). The proxy 24 then continues the redirect processing after the internal representative IP address link has been set up (S65).

Conversely, if it is determined that the management GUI node has not failed or shut down (S63: No), the proxy 24 determines that a problem has occurred in the host node 2 and shuts down the host node 2 (S66). By shutting down the host node 2, that is, the proxy node, the movement of the proxy 24 by the manager 25 is carried out.

In this way, by causing the proxy 24 to wait for the link of the internal representative IP address to be set up when the management GUI node has failed or shut down, the management PC 5 is able to continue accessing the management GUI unit 23.

Figure 14:
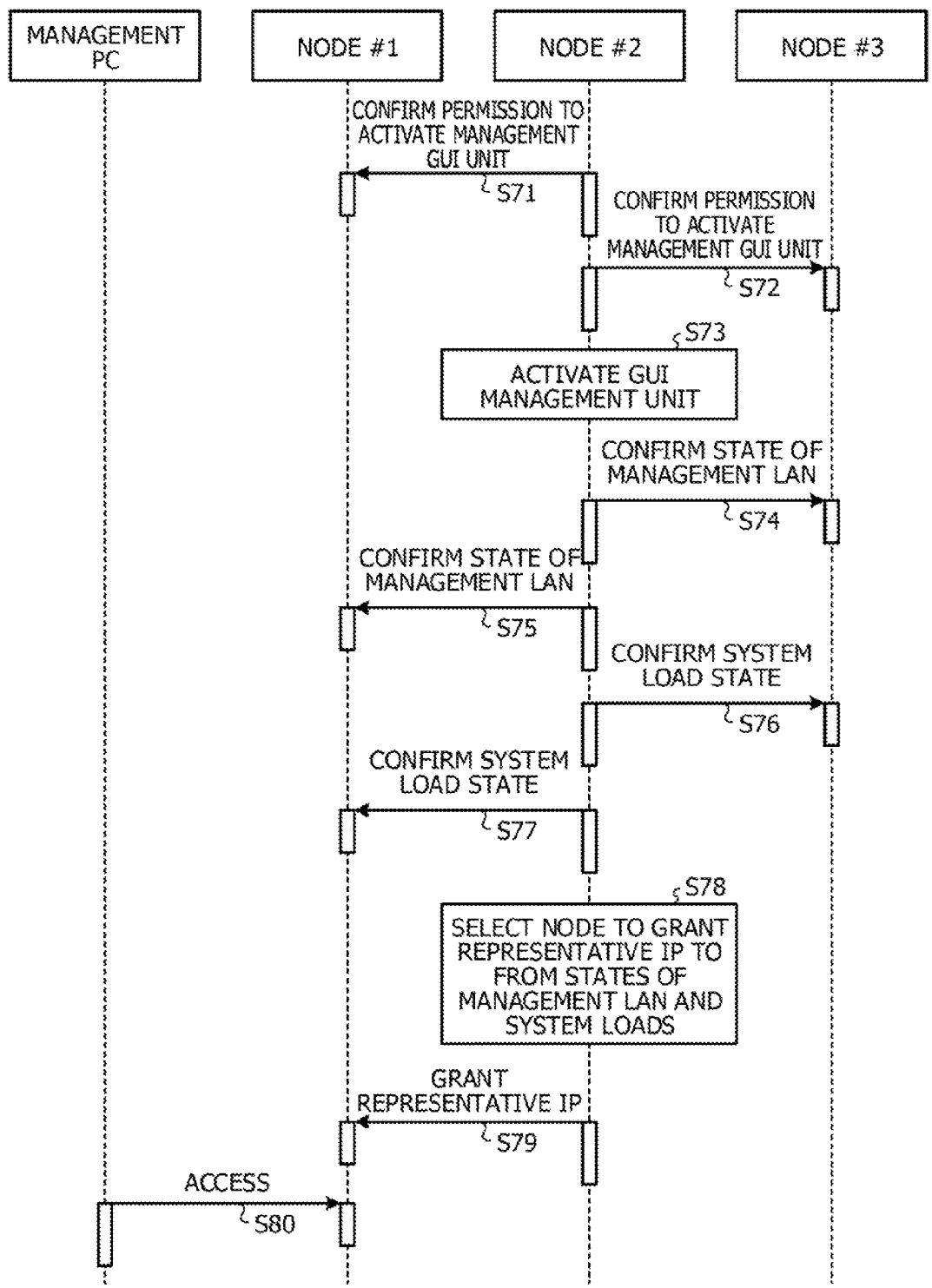
FIG. 14 illustrates a processing sequence for granting a representative IP address.

A processing sequence for granting the representative IP address will be discussed next. FIG. 14 illustrates a processing sequence for granting the representative IP address. The node #2 in FIG. 14 is the node 2 in which the manager 25 operates and the management GUI unit 23 is activated, and the node #1 is the node 2 in which the proxy 24 is activated.

As illustrated in FIG. 14, the manager 25 in the node #2 confirms permission to activate the management GUI unit 23 with the node #1 and the node #3 (S71, S72). After confirming the permission to activate, the manager 25 activates the management GUI unit 23 (S73).

The manager 25 confirms the state of the management LAN 6 with the node #3 and the node #1 (S74, S75) and confirms the system load state with the node #3 and the node 31 (S76, S77).

The manager 25 then selects the node 2 for granting the representative IP address from the states of the management LAN 6 and the system loads (S78), and grants the representative IP address to the selected node 2 (S79). In this example, the node #1 is selected and the representative IP address is granted to the node #1. The management PC 5 uses the representative IP address to access the node #1 (S80).

In this way, the management PC 5 is able to communicate with the management GUI unit 23 due to the manager 25 granting the representative IP address to the node 2 selected based on the states of the management LAN 6 and the system loads.

Figure 15:
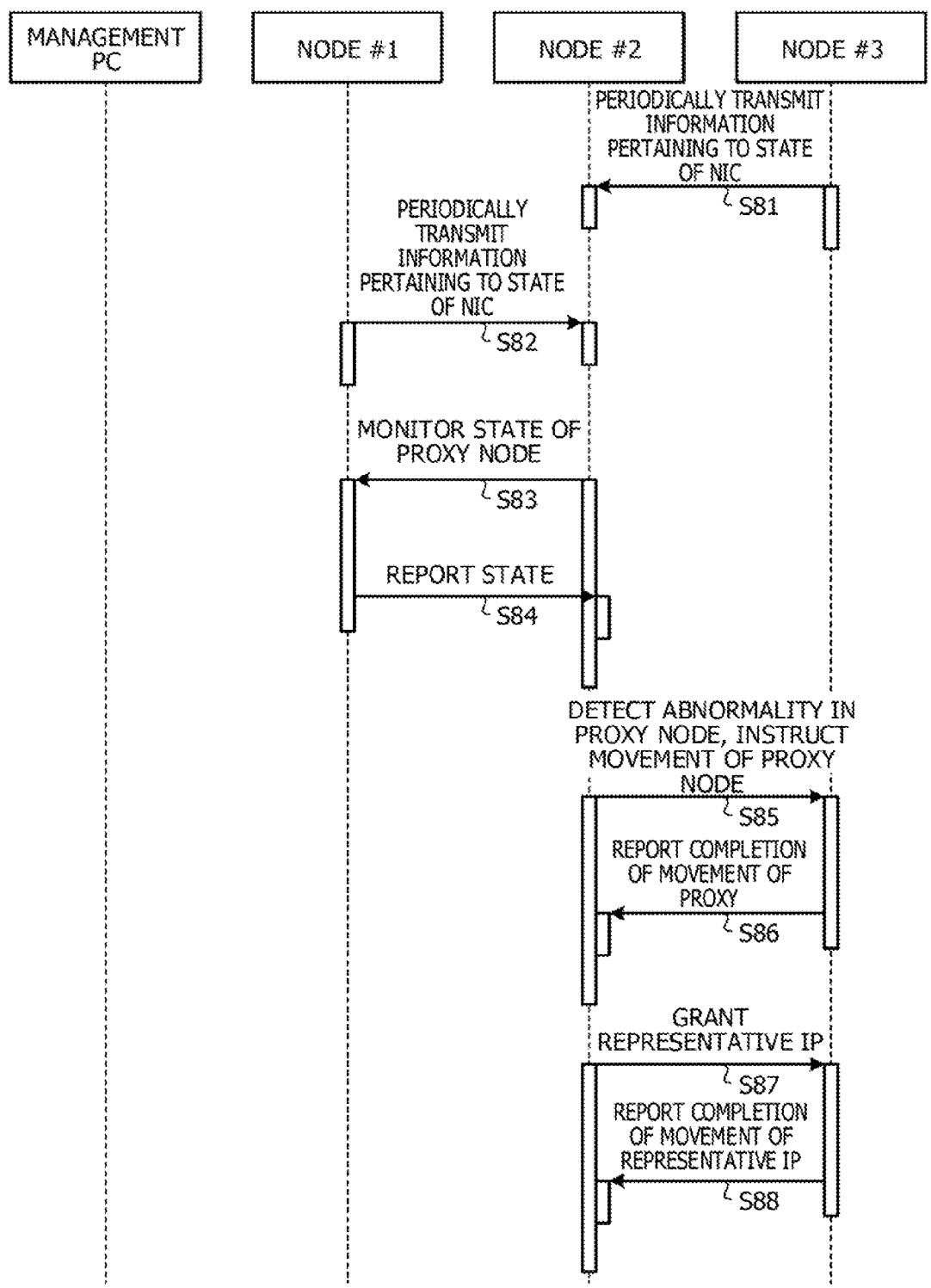
FIG. 15 illustrates a processing sequence for monitoring the state of a management LAN.

A processing sequence for monitoring the state of the management LAN 6 will be discussed next. FIG. 15 illustrates a processing sequence for monitoring the state of the management LAN 6. The node #2 in FIG. 15 is the node 2 in which the manager 25 operates, the node #1 is the node 2 that is the movement origin of the proxy 24, and the node #3 is the node 2 that is the movement destination of the proxy 24.

As illustrated in FIG. 15, the agents 26 in the node #3 and the node #1 periodically transmit information pertaining to the states of the NICs to the agent 26 in the node #2 (S81, S82).

The manager 25 operating in the node #2 obtains the information pertaining to the state of the NIC in the proxy node from the agent 26, and when an abnormality is detected based on the obtained information, monitors the state of the proxy node (S83). When the proxy node reports the state (S84), the manager 25 operating in the node #2 detects the abnormality of the proxy node and instructs the node #3 to move the proxy 24 (S85).

The node #3 reports to the node #2 the completion of the movement of the proxy 24 (S86), and the manager 25 operating in the node #2 grants the representative IP address to the node #3 (S87). The node #3 reports to the node #2 the completion of the movement of the representative IP address (S88).

In this way, the manager 25 monitors the proxy node and moves the proxy node and the representative IP address if the proxy node has an abnormality, and consequently the management PC 5 is able to access the management GUI unit 23 even if the node 2 in which the proxy 24 operates fails.

Figure 16A:
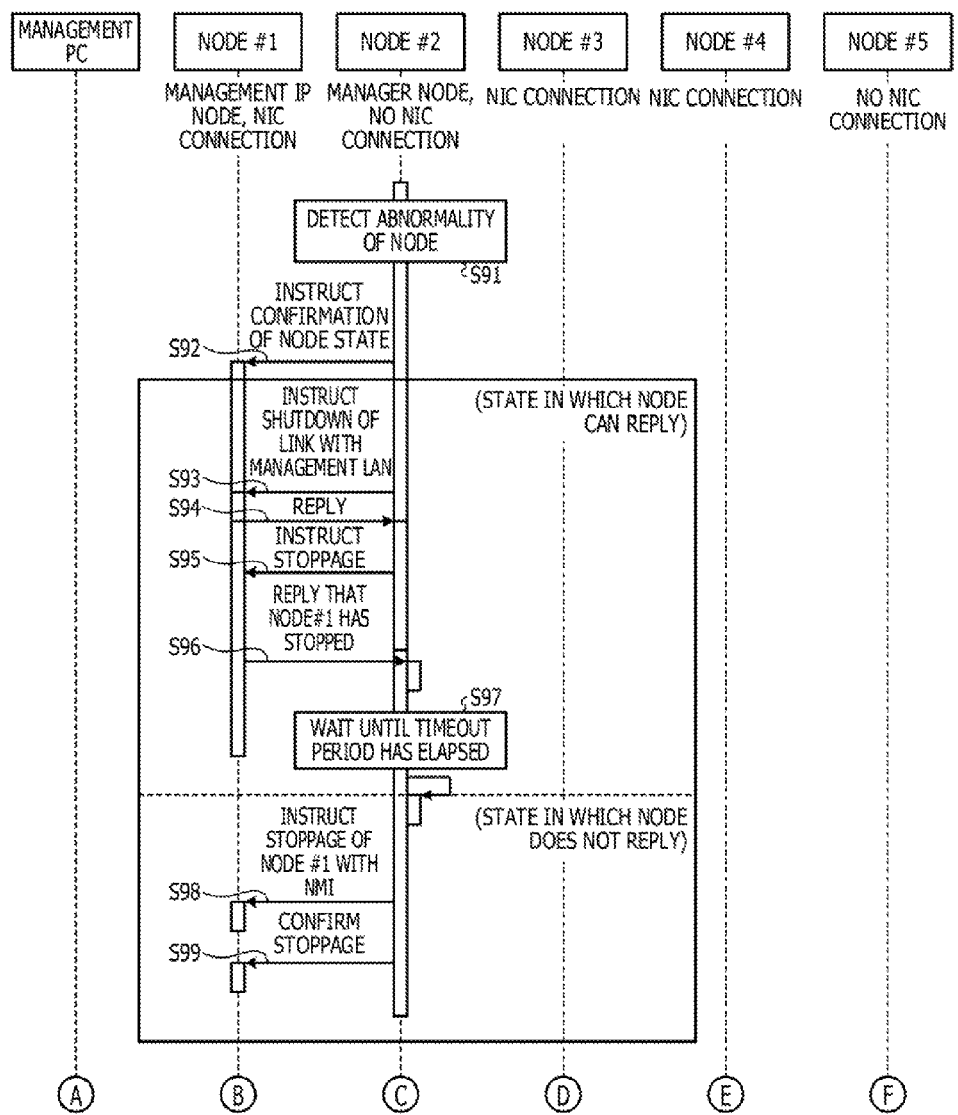

A processing sequence for granting the representative IP address when there are a plurality of candidates for representative IP address movement destinations will be discussed next. FIGS. 16A and 16B illustrate a processing sequence for granting a representative IP address when there are a plurality of candidates for movement destinations of the representative IP address.

The node #2 in FIG. 16A is the node 2 in which the manager 25 operates. The node #1 is the node 2 that is the proxy 24 movement origin. The node #3 or the node #4 is the node 2 that is the proxy 24 movement destination. The node #1, the node #3, and the node #4 have NIC connections with the management LAN 6. The node #2 and the node #5 do not have NIC connections with the management LAN 6. The manager node is the node 2 in which the manager 25 operates.

As illustrated in FIG. 16A, the manager 25 that operates in the node #2 detects an abnormality in node #1 (S91) and instructs the node #1 to confirm the state of the node (S92). If the node #1 is in a state of being able to reply, the manager 25 instructs the node #1 to shut down the link with the management LAN 6 (S93) and the node #1 shuts down the link with the management LAN 6 and issues a reply to the node #2 (S94). The manager 25 then instructs the node #1 to stop (S95). The node #1 replies to the node #2 that the node #1 is being stopped (S96).

If there is no reply from the node #1, the manager 25 waits until the timeout period has elapsed (S97). After the time period has elapsed or if the node #1 is not able to reply, the manager 25 uses the NMI to instruct the node #1 to stop (S98). The manager 25 then confirms that the node #1 has stopped (S99).

As illustrated in FIG. 16B, the manager 25 confirms the NIC states of the node #3 and the node #4 that have NIC connections (S100, S102). The node #3 and the node #4 report the NIC states and the system loads (S101, S103).

If the load of the node #3 is less than the load of the node #4, the manager 25 instructs the node #3 to activate the proxy 24 (S104). The node #3 activates the proxy 24 and reports to the manager 25 that the activation is complete (S105). The manager 25 then grants the representative IP address to the node #3 (S106). The node #3 reports to the manager 25 that the activation of the granted representative IP address is complete (S107).

If the load of the node #4 is less than the load of the node #3, the manager 25 instructs the node #4 to activate the proxy 24 (S108). The node #4 activates the proxy 24 and reports to the manager 25 that the activation is complete (S109). The manager 25 then grants the representative IP address to the node #4 (S110). The node #4 reports to the manager 25 that the activation of the granted representative IP address is complete (S111).

In this way, the manager 25 is able to equalize the loads between the nodes 2 and to speed up the processing of the proxy 24 as much as possible by moving the proxy 24 to the node 2 with the smallest load.

A processing sequence for switching the management GUI node when a node in which both the manager 25 and the management GUI unit 23 operate fails will be discussed next. FIG. 17 illustrates a processing sequence for switching the management GUI node when a node 2 in which both the manager 25 and the management GUI unit 23 operate fails. The node #1 in FIG. 17 is the proxy node. The node #2 is the node 2 that is the movement origin of the manager 25 and the management GUI unit 23. The node #3 is the node 2 that is the movement destination of the manager 25 and the management GUI unit 23.

As illustrated in FIG. 17, the management PC 5 makes a GUI connection with the node #2 through the proxy node (S121). When the node #2 fails, the cluster 27 of the node 2 that constitutes the storage cluster with the node #2 causes the manager 25 to operate due to the processing to switch the cluster. The cluster 27 obtains the load conditions of the nodes 2 from the agent 26 in each node 2 and compares the load conditions (S122).

The manager 25 decides that the node #3 is the takeover destination of the management GUI unit 23 (S123) and moves the management GUI unit 23 to the node #3 (S124). The manager 25 sets up the link with the internal representative IP address in the node #3 (S125).

The proxy node then resends the GUI connection after the timeout to the node #3 (S126). The proxy node causes the management GUI unit 23 in the node #3 to reply to the management PC 5 via the proxy node (S127).

In this way, the cluster 27 in the node 2 that constitutes the storage cluster with the failed node 2 causes the manager 25 to operate when the node 2 in which both the manager 25 and the management GUI unit 23 operate fails. Therefore, the manager 25 is able to move the management GUI unit from the failed node 2 to another node 2 even when the management GUI unit 23 and the manager 25 operate in the same node 2.

The management GUI unit 23, the proxy 24, the manager 25, the agent 26, and the cluster 27 are realized by a storage control program having the same functions being executed by a microprocessing unit (MPU) in the nodes 2. A hardware configuration of the node 2 that executes the storage control program will be discussed next.

Figure 18:
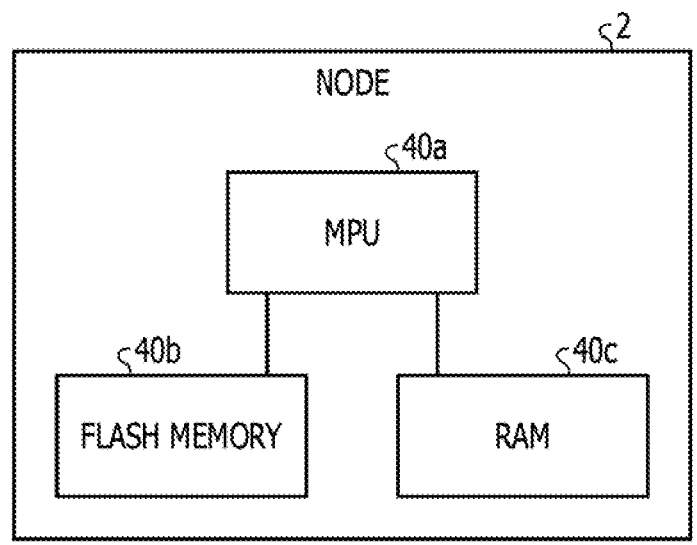
FIG. 18 illustrates a hardware configuration of a node that executes a storage control program.

FIG. 18 illustrates a hardware configuration of the node 2 that executes the storage control program. As illustrated in FIG. 18, the node 2 includes a MPU 40a, a flash memory 40b, and a random access memory (RAM) 40c.

The MPU 40a is a processing device for reading the storage control program stored in the RAM 40c and executing the program. The flash memory 40b is a non-volatile memory for storing the storage control program. The storage control program is read from the flash memory 40b into the RAM 40c and executed by the MPU 40a. The RAM 40c is a memory for storing the storage control program, data used for executing the storage control program, and the results obtained while executing the storage control program.

A magnetic storage device, an optical disk, or a magneto-optic recording medium may be used as the storage device for storing the storage control program. The magnetic recording device includes a hard-disk drive (HDD) and the like. The optical disk includes a digital versatile disk (DVD), a DVD-RAM, or a compact disc-read only memory (CD-ROM)/compact disc-rewritable (CD-RW), and the like. The magneto-optic recording medium includes a magneto-optical disk (MO) and the like.

When the storage control program is distributed, the program may be sold, for example, as a program recorded on a portable recording medium such as a DVD or a CD-ROM and the like. Alternatively, the storage control program may be stored in a storage device in a server computer and the storage control program may be transferred from the server computer to a control module through a network.

The node 2 stores the storage control program recorded on the portable recording medium or the storage control program transferred from the server computer in the flash memory 40b. The MPU 40a retrieves the storage control program from the flash memory 40b and executes processing according to the storage control program. The MPU 40a may retrieve the storage control program directly from the portable recording medium and execute processing according to the storage control program.

As described above, the selecting unit 25a (see, e.g., FIG. 4) of the manager 25 selects the node 2 in which the proxy 24 operates from the nodes 2 connected to the management PC 5, and the granting unit 25b of the manager 25 grants the representative IP address to the node 2 selected by the selecting unit 25a. The proxy 24 then redirects the access from the management PC 5 to the node 2 in which the management GUI unit 23 operates.

As a result, the node 2 in which the management GUI unit 23 operates is not necessarily hardwired to the management PC 5 and only a portion of the nodes 2 may be hardwired to the management PC 5 in the storage system 1. Therefore, the effort required for hardwiring and the costs for hardwiring can be reduced in the storage system 1.

When the node 2 in which the proxy 24 operates fails, the manager 25 selects the movement destination of the proxy 24 and the representative IP address from the other nodes 2 hardwired to the management PC 5. The manager 25 then moves the proxy 24 and the representative IP address to the selected node 2. Therefore, the management PC 5 is able to continue accessing the management GUI unit 23 even when the node 2 in which the proxy 24 operates fails.

When the node 2 in which the management GUI unit 23 operates fails, the manager 25 selects the movement destination of the management GUI unit 23 and the internal representative IP address from the other nodes 2. The manager 25 then moves the management GUI unit 23 and the internal representative IP address to the selected node 2. Therefore, the management PC 5 is able to continue accessing the management GUI unit 23 even when the node 2 in which the management GUI unit 23 operates fails.

While a case in which the management GUI unit 23 causes the proxy 24 to operate in a separate node 2 is discussed, the present disclosure is not limited in this way and a case in which another functional unit causes the proxy to operate in a separate node 2 may be applicable.

While a case in which the management switch 4 is hardwired to the nodes 2 is discussed, the present disclosure is not limited in this way and a case in which the nodes 2 are connected though an interface with the management switch 4 may be applicable.

All examples and conditional language recited herein are intended for pedagogical purposes to aid the reader in understanding the invention and the concepts contributed by the inventor to furthering the art, and are to be construed as being without limitation to such specifically recited examples and conditions. Also, the organization of such examples in the present specification does not relate to a showing of the superiority and inferiority of the invention. Although the embodiment of the present invention has been described in detail, it should be understood that various changes, substitutions, and alterations could be made hereto without departing from the spirit and scope of the invention.

What is claimed is:

1. A storage system comprising:
    an information processor apparatus for managing the storage system; and
    a plurality of storage devices including a first storage device, the first storage device is configured to:
        select a second storage device coupled over a network with the information processor apparatus from among the plurality of storage devices, and
        assign a representative address to be used for communication with the information processor apparatus to the selected second storage device,
    wherein the second storage device is configured to:
        receive a request addressed to the representative address from the information processor apparatus, and
        transfer the request to a third storage device among the plurality of storage devices to process the request.

2. The storage system according to claim 1, wherein the first storage device and the third storage device are the same storage device.

3. The storage system according to claim 1, wherein the first storage device is further configured to:
    select a fourth storage device from among the plurality of storage devices, different from the second storage device and coupled over a network with the information processor apparatus, when the second storage device fails,
    cancel the representative address assigned to the second storage device, and
    assign the representative address to the selected fourth storage device, and
    wherein the fourth storage device is configured to:
    receive a request addressed to the representative address from the information processor apparatus, and
    transfer the request to the third storage device.

4. The storage system according to claim 1, wherein the first storage device is further configured to:
    select another storage device different from the third storage device from among the plurality of storage devices when the third storage device fails, and
    wherein the second storage device is further configured to:
        receive a request from the information processor apparatus, and
        transfer the request to the another storage device.

5. The storage system according to claim 4, wherein the first storage device is further configured to:
    assign an internal address used for transferring the request to the third storage device, and wherein the second storage device is further configured to:

transfer the request to the internal address assigned to the third storage device when the request is received from the information processor apparatus, and cancel the internal address assigned to the third storage device and assign the internal address to the selected another storage device, when the third storage device has failed.

6. The storage system according to claim 5, wherein the internal address assigned to the third storage device and the internal address assigned to the another storage device are the same fixed value.

7. The storage system according to claim 1, wherein the request is a request submitted using a user interface displayed by the information processor apparatus.

8. The storage system according to claim 1, wherein the first storage device is further configured to:

obtain a count of the number of storage devices coupled over a network with the information processor apparatus from among the plurality of storage devices, and select a storage device having the lowest load and in which the load does not statistically increase as the second storage device from two or more storage devices pertaining to the count based on the loads of each of the two or more storage devices, when it is determined that the number is two or greater.

9. The storage system according to claim 1, further comprising:

two interconnect switches coupled to each of the plurality of storage devices, wherein the second storage device is configured to:

transfer the request to the third storage device via a first interconnect switch among the two interconnect switches, and transfer the request to the third storage device via a second interconnect switch among the two interconnect switches when an abnormality in a path through the first interconnect switch occurs.

10. An information processing method executed by a storage system including an information processor apparatus and a plurality of storage devices including a first storage device, the information processor method comprising:

selecting, by the first storage device, a second storage device coupled over a network with the information processor apparatus from among the plurality of storage devices;

assigning a representative address to be used for communication with the information processor apparatus to the selected second storage device;

receiving, by the second storage device, a request addressed to the representative address from the information processor apparatus; and transferring the request to a third storage device among the plurality of storage devices to process the request.

11. The information processing method according to claim 10, wherein the first storage device and the third storage device are the same storage device.

12. The information processing method according to claim 10, further comprising:

selecting, by the first storage device, a fourth storage device from among the plurality of storage devices, different from the second storage device and coupled over a network with the information processor apparatus, when the second storage device fails;

cancelling the representative address assigned to the second storage device;

assigning the representative address to the selected fourth storage device;

receiving, by the fourth storage device, a request addressed to the representative address from the information processor apparatus; and transferring the request to the third storage device.

13. The information processing method according to claim 10, further comprising:

selecting, by the first storage device, another storage device different from the third storage device from among the plurality of storage devices when the third storage device fails;

receiving, by the second storage device, a request from the information processor apparatus; and transferring the request to the another storage device.

* * * * *